United States Patent [19]

Sambrook et al.

[11] Patent Number: 4,522,940

[45] Date of Patent: Jun. 11, 1985

[54] METHOD OF PREPARING A CATALYST AND CATALYST PREPARED BY THE METHOD

[75] Inventors: Rodney M. Sambrook, Sheffield; Julian R. H. Ross, Cleckheaton, both of England

[73] Assignee: Dyson Refractories Limited, United Kingdom

[21] Appl. No.: 283,792

[22] Filed: Jul. 16, 1981

[30] Foreign Application Priority Data

Jul. 16, 1980 [GB] United Kingdom ................. 8023225

[51] Int. Cl.$^3$ .......................... B01J 21/04; B01J 23/78
[52] U.S. Cl. .................................. 502/328; 502/300; 502/335; 502/439; 423/654
[58] Field of Search ..................... 252/466 J; 423/654; 502/328, 335, 439, 300

[56] References Cited

U.S. PATENT DOCUMENTS

| | | |
|---|---|---|
| Re. 28,655 | 12/1975 | Rostrup-Nielsen ............. 423/654 X |
| 2,695,893 | 11/1954 | Houdry ................................ 252/451 |
| 3,444,099 | 5/1969 | Taylor et al. .................... 252/466 J |
| 3,794,588 | 2/1974 | Stiles ................................ 252/462 |
| 3,892,897 | 7/1975 | Rittler ................................ 427/463 |
| 3,928,002 | 12/1975 | Morikawa et al. .................... 48/214 |
| 3,941,721 | 3/1976 | Broecker et al. ................ 252/466 J |
| 3,992,166 | 11/1976 | Okagami et al. ................. 48/214 A |
| 4,113,658 | 9/1978 | Geus .................................... 252/454 |
| 4,124,629 | 11/1978 | Hansford ..................... 260/449.6 M |
| 4,191,664 | 3/1980 | McArthur ........................... 502/335 |
| 4,207,211 | 6/1980 | Russ et al. ..................... 423/654 X |

FOREIGN PATENT DOCUMENTS

| | | |
|---|---|---|
| 0042471 | 12/1981 | European Pat. Off. . |
| 740634 | 10/1943 | Fed. Rep. of Germany . |
| 1220105 | 1/1971 | United Kingdom . |
| 1318528 | 5/1973 | United Kingdom . |
| 1426270 | 2/1976 | United Kingdom . |
| 1590606 | 6/1981 | United Kingdom . |

*Primary Examiner*—W. J. Shine
*Attorney, Agent, or Firm*—King, Liles & Schickli

[57] ABSTRACT

An improved catalyst for the high temperature steam reforming of hydrocarbons is provided. The method of preparing the catalyst includes the steps of: (1) impregnating a ceramic matrix with a solution containing soluble salts of the catalytic components and a delayed precipitating agent; (2) removing the matrix from the solution; (3) draining the matrix; (4) heating the matrix to a temperature suitable for the controlled hydrolysis of the precipitation agent, thus increasing the pH of the absorbed solution and bringing about deposition of the insoluble hydroxides within the pores; (5) calcining the precipitate within the pores to a mixture of the oxides; and (6) reducing the oxides.

19 Claims, No Drawings

METHOD OF PREPARING A CATALYST AND CATALYST PREPARED BY THE METHOD

This invention relates to a method for the production of catalysts.

In service, catalysts must not only be capable of selectively catalysing chemical reactions but also be mechanically robust to withstand normal process conditions and possible plant operations such as catalyst regeneration following, e.g., catalyst poisoning. Commercial catalysts have therefore to satisfy the dual requirement of high stable activity and long service life. High catalytic activity is related to a high specific surface area and the accessibility of that surface area. Generally the porosity and pore size distribution of the catalysts must be such that the catalyzed reactions are not wholly diffusion limited, i.e., there is reasonable access to the inner pore surfaces.

Heterogeneous catalysts which consist of metallic catalytic agents on porous carriers have been known for many years. They are often referred to as "supported catalysts", the "support" generally being of high surface area and of high stability. Examples of the supports are the transition aluminas ($\gamma$, $\kappa$, etc.), silicas, titania, etc. The efficiency of such catalysts depends on a number of properties such as activity, resistance to poisons, thermal stability and selectivity. For many purposes they must also be formed into pellets, or some other suitable form, so that they can be easily handled in service. Such catalyst pellets may have limited mechanical stability.

The various catalysts produced by existing techniques, such as impregnation of a high surface area performed carrier or the pelletizing of co-precipitated materials, in fact represent compromises between strength, activity and stability. For example, with co-precipitation, the precipitate is frequently a mixed hydroxide or basic hydroxide. These catalysts normally have high active surface areas. These hydroxide materials are generally calcined and then formed into pellets or some other suitable shape, and the catalysts may be activated prior to use or in situ. Particularly with this type of catalyst, the service life is very dependent on the strength of these pellets. A large number of such materials are in common industrial use, for example, nickel-alumina catalysts used for the steam reforming of hydrocarbons in the production of synthetic natural gas. Co-precipitated catalysts normally have higher active surface areas than catalysts prepared by other methods.

Where mechanical strength of the catalysts is of prime importance, impregnation of low surface area preformed refractory materials, such as $\alpha$-alumina or mullite, is commonly practised particularly in the manufacture of nickel catalysts for use in cyclic steam reforming plants. These catalysts normally have low active surface areas.

The object of the present invention is to provide catalysts of relatively high active surface areas and yet have the benefit of the high mechanical strength of a ceramic matrix.

According to the present invention, a method of preparing a catalyst comprises precipitating a catalytically active component together with appropriate spacers and/or promoters within the pores of a performed, low surface area, ceramic matrix, to establish therein a substantially stable, high surface area active phase. "Catalytically active component" as used herein means a metal or compound thereof that has catalytic activity either as formed or when in a reduced or otherise activated state, a "spacer" means a material that helps to stablise small crystallites of the metallic catalytic agent, for example, by preventing these particles coalescing, and "promoter" means a material which brings about a different selectivity in the catalyst compared with the material without promoter, for instance by preventing undesirable side-reactions such as coke formation, etc.

Preferably the technique used is that of homogeneous co-precipitation using an easily hydrolysable organic salt such as urea which gives an increase in pH of the solution held within the pores of the ceramic matrix when the matrix is heated.

Any metallic ion may be used which gives rise to an insoluble hydroxide or basic hydroxide (or combinations of species, mixed hydroxides or their equivalents) in the presence of the readily hydrolysable material such as urea which gives an increase in pH of the solution on elevating the temperature when the solution is retained within the pores of the ceramic matrix. The method allows the facile inclusion of various promoters and/or spacers as may be required for specific catalytic processes. The porous ceramic matrix may be of $\alpha$-alumina but other preformed matrices of ceramic materials such as silicon carbide, chromic oxide, aluminosilicates, silica, etc., may be used.

Preferably, the ceramic matrix has an apparent porosity in the range 15% to 80% and has a mean pore diameter in the range 0.05 $\mu$m to 20 $\mu$m. In the special case of hollow shapes such as hollow spheres, the porosity and mean pore diameter of the wall material will be in the aforementioned range. The ceramic matrix may be pretreated with acid or alkali to encourage an interaction with the active phase.

The surface of the ceramic matrix may also be modified by the addition of "spacer/support" material, for example alumina, within the pores of the ceramic matrix prior to the deposition of the active phase. This may be accomplished by the simple impregnation of the ceramic matrix with a soluble salt of the "spacer/support" material, e.g., aluminium nitrate or by using the process claimed by this patent. In each case, the temperature of the calcination of the impregnated ceramic matrix must be carefully controlled to achieve the required surface properties. Such materials may then provide a superior catalyst carrier for standard impregnated catalysts.

To provide the active phase within the preformed ceramic matrix, the matrix is impregnated, preferably under vacuum, with a solution of soluble salts containing the required catalytic components and a hydrolysable compound which gives an increase in pH of the solution on heating, the ceramic matrix then being removed from the solution and drained. After draining, the ceramic matrix is heated to a temperature suitable for the controlled hydrolysis of the precipitation agent, which may be urea or a similar material, thus increasing pH of the absorbed solution and bringing about deposition of the insoluble oxides within the pores. This effectively blocks the pores to further impregnation.

Prior to re-impregnation of the catalyst, the pores must be opened. In one aspect of the invention, the pores are opened by thermal decomposition of material within the pores. In a second aspect of the invention, the catalyst is washed with water or a weak alkaline solution for example 0.1 M potassium hydroxide, and then dried at an elevated temperature. The metal loading of the catalyst may therefore be increased by multi-impregnation steps.

It will also be obvious to those skilled in the art of catalyst manufacture that the deposition of the components of the active phase may be carried out sequentially. Subsequent treatment of the catalyst depends on the nature of the catalyst and its intended use.

In the case of impregnation by mixtures of salts of metallic ions, well defined hydroxide compounds may result from the controlled precipitation. Examples of such compound formation are described in co-pending U.S. application Ser. No. 283,793 of even date herewith.

According to a still further aspect of the invention, a method of preparing a catalyst particularly but not exclusively for use in the steam reforming of hydrocarbons comprises incorporating magnesium in a nickel aluminium active phase contained within the pores of a preformed ceramic matrix by inclusion of a magnesium salt in a solution of nickel and aluminium salts prior to precipitation of the hydroxides, by homogeneous precipitation techniques, and post impregnation of the calcined nickel aluminium magnesium active phase with a soluble barium salt with subsequent calcination to the oxides. Preferably, the nickel content of the catalyst should be between 5 and 30 wt. % and the Ni:Al atomic ratio 1.5 to 4.0:1 and that for Ni:Mg 1 to 20:1. The barium content of the catalyst is preferably in the range 0.2% to 10% by weight, it being further preferred that the barium content is in the range 0.2% to 5% by weight.

Several non-limitive examples of catalysts according to the invention are given below:

EXAMPLE 1

Nickel catalysts of approximately the same nickel content were prepared: (a) by conventional impregnation of a preformed α-alumina matrix with nickel nitrate hexahydrate solution at 85° C. and subsequently calcining the resultant material in air at 450° C. and then reducing it in hydrogen at 600° C. (Sample A) and (b) using the techniques of the present invention, by impregnation of a preformed α-alumina matrix with a nickel nitrate/urea solution, draining off the excess liquor, heating the resultant material to 90° C. to bring about precipitation within the pores, drying the material at a suitable elevated temperature, calcining in air at 450° C., and reducing in hydrogen at 600° C. (Sample B).

A specific advantage of a method of the invention lies in the fact that minimal reagent loss occurs and in contrast with other methods of precipitation or impregnation the active phase is almost exclusively confined to the pores of the support.

The nickel crystallite sizes of the reduced catalysts from (a) and (b) were determined by conventional X-ray line broading techniques. It is generally accepted that the metallic crystallite sizes of catalysts are a good indication of the activity of the catalyst; the lower crystallite size giving the higher activity.

The catalysts from (a) and (b) were aged at 800° C. in steam and hydrogen for four hours. The nickel crystallite sizes were redetermined. The rate of growth of the crystallites during the ageing test can be related to the stability of the catalyst under hydrothermal conditions and may give an indication of the expected service life of the catalysts.

The advantages of using the homogeneous precipitation techniques can be seen on comparison of nickel crystallite size. Not only is the nickel crystallite size smaller for the homogeneous precipitation method but the material is also slightly more stable.

| Catalyst | Nickel Crystallite Size/Å | |
|---|---|---|
| | fresh reduced | aged |
| A | 300 | 1000 |
| B | 250 | 750 |

EXAMPLE 2

The nickel crystallite size of the reduced catalyst was decreased significantly by incorporating aluminium nitrate in the nickel nitrate/urea solution prior to deposition. The finished catalyst (Sample C) was prepared as in method (b) in Example 1. In addition the stability of the reduced catalyst under hydrothermal conditions was greatly improved by the addition of magnesium nitrate to the impregnating solution prior to deposition. The finished catalyst (Sample D) was prepared as in method (b) in Example 1. Nickel crystallite size determinations by X-ray line broadening techniques were again made on freshly reduced and aged samples.

| Catalyst | Nickel Crystallite Size/Å | |
|---|---|---|
| | fresh reduced | aged |
| C | 235 | 530 |
| D | 180 | 340 |

EXAMPLE 3

Nickel catalysts were prepared (a) by impregnation of a preformed α-alumina matrix with nickel, aluminium and magnesium nitrates/urea solution, heating to 90° C., drying at an elevated temperature and calcining in air at 450° C., (Sample E), the Ni:Al:Mg weight ratio being 3:1:0.2 (b) by impregnation of catalyst Sample E by barium acetate solution and drying, re-calcining in air at 450° C. (Sample F). The catalyst Sample F contained 0.5% by weight of barium.

Catalyst Samples E and F were tested for reforming activity. The catalysts were crushed and then screened to approximately 1 mm diameter granules. 5 ccs of the catalyst were placed in a tube reactor. The catalysts were reduced in hydrogen at 500° C. Heptane was fed to the reactor at an LHSV of 5 and a steam: C ratio of 4:1 for four hours. The exit temperature was maintained at 650° C. The gasification activity of the catalyst was noted. Sample E gave 100% gasification of the feedstock but carbon was deposited on the catalyst. Sample F, containing barium, gave 100% gasification without carbon deposition.

We claim:
1. A method of making a catalyst having a catalytically active component located within the pores of a preformed low surface area ceramic matrix, comprising the steps of:
  impregnating the pores of the matrix with a catalyst precursor solution including salts of at least one catalytically active metal component and a hydrolysable material;
  removing excess solution from the matrix while maintaining solution within the pores;
  heating the matrix to a temperature suitable for controlled hydrolysis of the hydrolysable material, said controlled hydrolysis serving to increase the pH of the solution within the pores so as to precipitate said at least one catalytically active component substantially exclusively within the pores of the matrix; and calcining the matrix to produce the catalyst.

2. A method according to claim 1, wherein the hydroysable material is urea.

3. A method according to claim 1, wherein the solution contains salt of nickel and aluminium and magnesium.

4. A method according to claim 3, wherein the nickel content of the formed catalyst is between 5 and 30 percent by weight, and the Ni:Al atomic ratio is 1.5 to 4.0:1 and the Ni:Mg atomic ratio is 1 to 20:1.

5. A method according to claim 1, wherein said impregnating step is performed under vacuum.

6. A method according to claim 1, including the additional step of reopening the pores of the matrix and repeating the impregnating, removing and heating steps so as to increase loading of the catalytically active component in the pores of the matrix.

7. A method according to claim 6, wherein said reopening step is performed by washing the matrix with a solution selected from the group consisting of water and weak alkali, and followed by drying.

8. A method according to claim 6, wherein said reopening step is performed by thermally decomposing the hydrolyzed impregnated material present in the pores.

9. A method according to claim 1, including the additional step of pretreating the pores of the matrix with acid prior to impregnating.

10. A method according to claim 1, including the additional step of pretreating the pores of the matrix with alkali prior to impregnating.

11. A method according to claim 1, including the additional step of pretreating the pores of the matrix by depositing alumina spacer/support material therein prior to impregnating.

12. A method according to claim 1, including the additional step of post-impregnating the pores of the matrix with barium.

13. A method according to claim 12, wherein the barium content of the catalyst is in the range of 0.2 to 10%.

14. A method according to claim 1, wherein said calcining step is performed at substantially 450° C.

15. A method according to claim 1, including the additional step of reducing said at least one catalytically active component in hydrogen.

16. A method according to claim 1, wherein said ceramic matrix has an apparent porosity in the range of 15% to 80% and a mean pore diameter in the range of 0.05 microns to 20.0 microns.

17. An improved catalyst of high active surface area and high mechanical strength, comprising:

at least one catalytically active metal component confined substantially exclusively within pores of a pre-formed low surface area ceramic matrix, said component having been so confined by the steps of impregnating the pores of the matrix with a catalyst precursor solution and a hydrolysable material; removing excess solution from the matrix while maintaining solution substantially exclusively within the pores; heating the matrix to a temperature suitable for controlled hydrolysis of said hydrolysable material, said controlled hydrolysis serving to increase the pH of the solution within the pores so as to precipitate said at least one catalytically active metal component from said solution substantially exclusively within the pores, followed by calcining to form the catalyst.

18. A catalyst according to claim 17, wherein said at least one catalytically active metal component includes nickel, aluminum and magnesium.

19. A catalyst according to claim 17, wherein said ceramic matrix has an apparent porosity in the range of 15% to 80% and a mean pore diameter in the range of 0.05 microns to 20.0 microns.

* * * * *